US010732950B1

(12) United States Patent
Coleman

(10) Patent No.: US 10,732,950 B1
(45) Date of Patent: Aug. 4, 2020

(54) COMPUTER IMPLEMENTED SYSTEM AND METHOD, AND A COMPUTER PROGRAM PRODUCT, FOR AUTOMATICALLY DETERMINING A CONFIGURATION OF A COMPUTING SYSTEM UPON WHICH A SOFTWARE APPLICATION WILL BE DEPLOYED

(71) Applicant: VCE IP Holding Company LLC, Richardson, TX (US)

(72) Inventor: Michael Coleman, Flower Mound, TX (US)

(73) Assignee: EMC IP HOLDING COMPANY LLC, Round Rock, TX (US)

( * ) Notice: Subject to any disclaimer, the term of this patent is extended or adjusted under 35 U.S.C. 154(b) by 0 days.

(21) Appl. No.: 16/262,156

(22) Filed: Jan. 30, 2019

Related U.S. Application Data

(63) Continuation of application No. 15/352,329, filed on Nov. 15, 2016, now Pat. No. 10,248,400.

(51) Int. Cl.
*G06F 8/61* (2018.01)
*G06F 8/60* (2018.01)
*H04L 12/24* (2006.01)
*H04L 12/927* (2013.01)

(52) U.S. Cl.
CPC .......... *G06F 8/61* (2013.01); *G06F 8/60* (2013.01); *H04L 41/0826* (2013.01); *H04L 47/803* (2013.01)

(58) Field of Classification Search
CPC .......... G06F 3/0629; G06F 8/61; G06F 8/60
See application file for complete search history.

(56) References Cited

U.S. PATENT DOCUMENTS

| 5,257,368 A | 10/1993 | Benson et al. |
| 6,260,020 B1 | 7/2001 | Ruffin et al. |
| 7,188,174 B2 | 3/2007 | Rolia et al. |

(Continued)

FOREIGN PATENT DOCUMENTS

FR 3037417 A1 12/2016

*Primary Examiner* — Phillip H Nguyen
(74) *Attorney, Agent, or Firm* — Womble Bond Dickinson (US) LLP

(57) ABSTRACT

Computer implemented systems and methods, and computer program products, for determining one or more proposed configurations of a computing system upon which a software application will be deployed. A proposed configuration may include a computing system having virtualized information technology resources deployed across an enterprise. For example, a method may include receiving software application information, such as information including software application identification information and software application licensing information. The method may further include receiving current computing system requirements information and future computing system requirements information, wherein the future computing system requirements information includes future computing system growth information and future computing system target utilization information. Additionally, the method may include dynamically generating and storing information about one or more proposed configurations based upon the received information to provide an optimized configuration wherein the total cost of ownership is minimized.

15 Claims, 4 Drawing Sheets

(56) References Cited

U.S. PATENT DOCUMENTS

| | | |
|---|---|---|
| 7,225,137 B1 | 5/2007 | Barritz |
| 7,356,679 B1 | 4/2008 | Le et al. |
| 9,274,811 B1 | 3/2016 | Reeves et al. |
| 9,639,338 B2 | 5/2017 | Ruehl et al. |
| 2005/0289538 A1 | 12/2005 | Black-Ziegelbein et al. |
| 2010/0278119 A1* | 11/2010 | Potkonjak ............. G06F 9/5011 370/329 |
| 2012/0239739 A1 | 9/2012 | Manglik et al. |
| 2012/0331114 A1 | 12/2012 | Garg et al. |
| 2013/0080408 A1 | 3/2013 | Cashman et al. |
| 2014/0033195 A1 | 1/2014 | Falodiya |
| 2014/0143427 A1* | 5/2014 | Hohenstein ............. H04L 67/16 709/226 |
| 2016/0337186 A1 | 11/2016 | Dolinsky et al. |
| 2017/0024396 A1 | 1/2017 | Adarsh et al. |
| 2017/0201569 A1 | 7/2017 | Fu et al. |
| 2018/0203739 A1* | 7/2018 | Brady ................. G06F 9/45558 |

* cited by examiner

COMPUTER IMPLEMENTED SYSTEM AND METHOD, AND A COMPUTER PROGRAM PRODUCT, FOR AUTOMATICALLY DETERMINING A CONFIGURATION OF A COMPUTING SYSTEM UPON WHICH A SOFTWARE APPLICATION WILL BE DEPLOYED

CROSS-REFERENCE TO RELATED APPLICATION(S)

The present application is a continuation of U.S. patent application Ser. No. 15/352,329, entitled: Computer Implemented System and Method, and a Computer Program Product, for Automatically Determining a Configuration of a Computing System upon which a Software Application will be Deployed, filed Nov. 15, 2016, the content of which is incorporated herein by reference in its entirety.

FIELD OF THE DISCLOSURE

Aspects of the disclosure relate to computing technology and, more particularly, to a computer implemented system and method, and a computer program product, for automatically determining a configuration of a computing system upon which a software application will be deployed.

BACKGROUND

Expansion for data processing of information within present corporate or enterprise environments requires an increase in processing cores, central processing units (CPUs), memory, and storage. However, as the need for more computing space and data rises, so does the cost of software deployed across the enterprise environment, since software licenses are based upon the number of cores, CPUs, and storage comprising the computing system upon which the software is installed. In particular, the total cost of ownership (TCO) is a financial estimate intended to help buyers and owners determine the direct and indirect costs of a product or system. It may include the costs of computer hardware and software, along with operational and long-term expenses. In particular, the computer hardware and software expenses may include the cost for the network (hardware and software), the server(s) (hardware and software), the workstation(s) (hardware and software), installation (hardware and software), purchasing research, warranties, licenses, license tracking and compliance, migration expenses, expenses associated with risk, support costs and the like.

As a solution to the proliferation of hardware, a converged infrastructure provides a solution for efficient use of resources, while minimizing infrastructure real estate and resources connected to networking, computing, and storage components. However, determining a configuration for a computing system upon with a software application is to be deployed can be a labor-intensive and complex task. Analyzing workloads, data volumes and systems to specify an appropriately sized computing system, such as a converged infrastructure computing system, to meet customer requirements (performance, scale, availability, capacity, and the like) is one of the steps in the architectural planning process. This analysis, however, is time consuming and tedious. Yet, computing system customers are increasingly sensitive to TCO with specific concerns surrounding software applications whose licensing costs are based upon the number of processors and/or processing cores. Accordingly, there exists a demand for a system and method for automatically determining a configuration for a proposed computing system upon which a software application will be deployed, which optimizes various parameters, such as TCO. It is within this context that the embodiments described below arise.

SUMMARY

Embodiments of a system and method for configuring a converged infrastructure based upon software deployment specifications are provided. It should be appreciated that the present embodiment can be implemented in numerous ways, such as a process, an apparatus, a system, a device, or a method. Several inventive embodiments are described herein.

In some embodiments, a computer implemented system and method, and a computer program product, for determining a configuration of a proposed computing system is provided; wherein, a software application will be deployed upon the computing system and the computing system may include virtualized information technology resources deployed across an enterprise. For example, a method may include receiving software application information, such as information including software application identification information and software application licensing information. The method may further include receiving proposed computing system information and future computing system requirements information, wherein the proposed computing system information includes proposed computing resources requirements information and the future computing system requirements information includes future computing system growth information and future computing system target utilization information. Additionally, the method may include dynamically generating and storing one or more proposed configurations based upon the received information to provide an optimized converged infrastructure wherein the total cost of ownership is reduced and/or some other parameter, including a customer-specified parameter, is optimized. Such parameters may include system performance, data center costs, footprint, etc.

It will be appreciated that the above summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
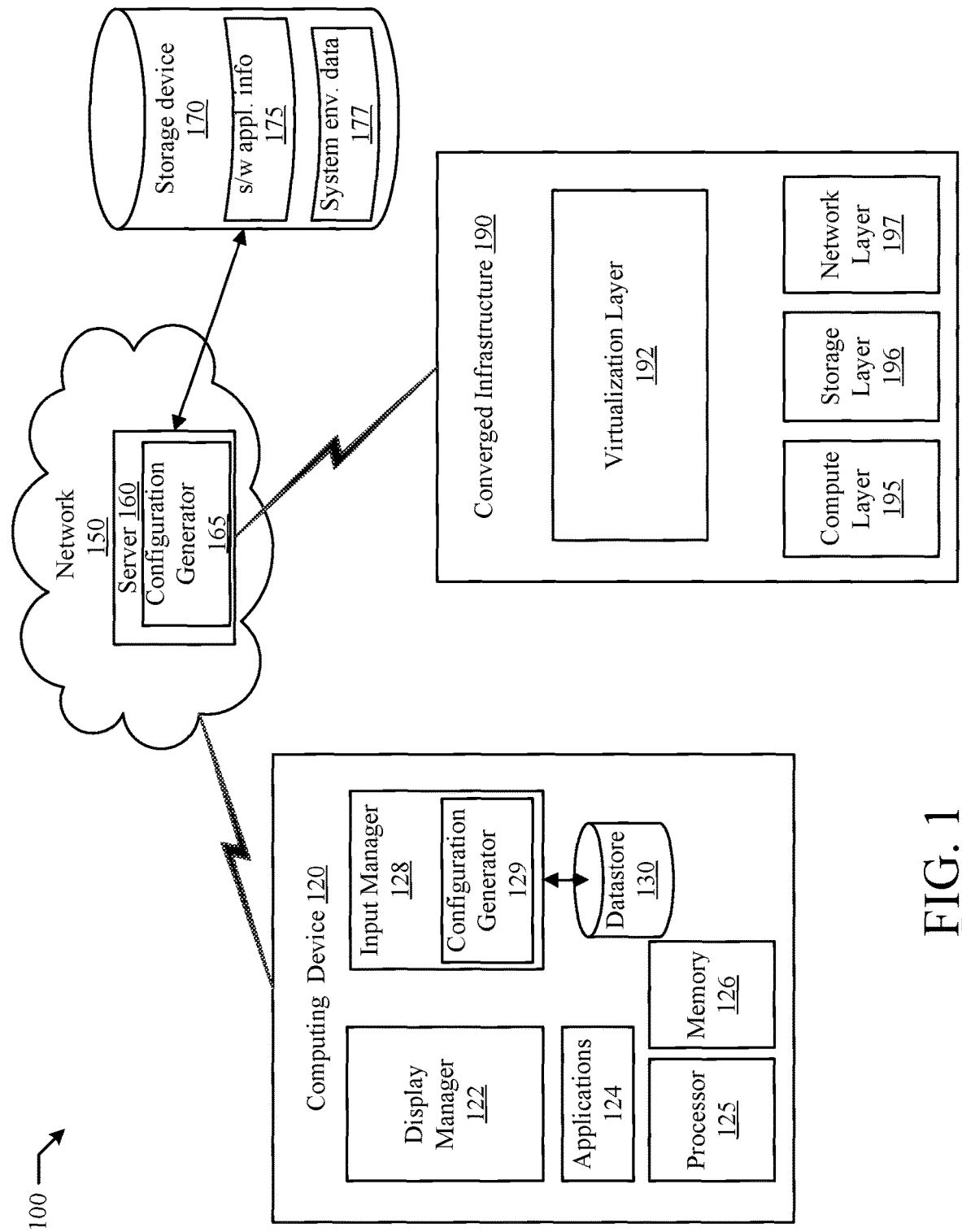
FIG. 1 is a perspective view of a converged infrastructure environment, across which an enterprise's virtualized resources may be configured based upon software specification and licensing metrics, in accordance with some embodiments.

The following embodiments describe a computer implemented system and method, and a computer program product, for determining a configuration of a proposed computing system, upon which a software application will be deployed. It can be appreciated by one skilled in the art, that the embodiments may be practiced without some or all of these specific details. In other instances, well known process operations have not been described in detail in order not to unnecessarily obscure the embodiments.

In particular, the system and method for dynamic configuration based upon software application specifications and metrics may include a computing device having a configuration generator for determining a configuration of a proposed computing system, upon which a software application will be deployed. The computing system may comprise a converged infrastructure, which may be used to provide virtualized information technology resources across an enterprise. For example, a method may include receiving, by a configuration generator, software application information, which includes software application identification information and software application licensing information. The method may further include receiving proposed (or current) computing system information and future computing system requirements information, wherein proposed computing system requirements information includes proposed computing resources requirements information and the future computing system requirements information includes future computing system growth information and future computing system target utilization information. Additionally, the method may include dynamically generating and storing one or more proposed configurations based upon the received information to provide an optimized converged infrastructure wherein the total cost of ownership is reduced.

In particular, responsive to receiving the software application information, the proposed computing system information and the future computing system requirements information, the system may generate one or more proposed computing system configurations or configuration information. The proposed computing system configuration information may include information identifying a proposed configuration for one or more proposed computing system, where each of the proposed configurations satisfies the proposed computing resources requirements identified in the proposed computing resources requirements information, and each of the proposed configurations satisfying the future computing system requirements identified in the future computing system requirements information.

In an exemplary embodiment, the software application identification information may comprise information identifying a software application to be deployed. The software application licensing information may comprise information identifying costs for licensing the identified software application. Further, the proposed computing resources requirements information may include information identifying one or more computing resources required for the proposed computing system, where in the identified one or more computing resources is one of a compute component, a memory component, a network component and a storage component. In addition, the future computing system growth information may comprise information identifying a growth rate for at least one of the computing resources of the proposed computing system; while, the future computing system target utilization information may include information identifying a maximum utilization of at least one of the computing resources of the proposed computing system.

As a benefit, the computer implemented system and method, and a computer program product, for determining a configuration of a proposed computing system upon which a software application may be deployed saves the system designer time and expense. In particular, the systems and methods disclosed herein offer the ability to easily evaluate various computing system options/combinations in an effort to recommend the most cost-effective solution that meets the computing environment requirements and specifications. It may provide technical output and supporting data for the proposed configuration and may generate information identifying the cost-effective configuration. In particular, along with recommended configurations, the computer implemented system and method may provide supporting technical and financial data based upon architectural and business inputs.

In some embodiments, the computer implemented system and method may accept as input current computing environment configuration information for an existing or new software application, such as a database application available from Oracle® Corporation of Redwood Shores, Calif. The current computing environment information may be received from the computing system upon which the existing software application is currently deployed. Further, the systems and methods described herein may receive Oracle® database license information, technical requirements for deploying the software application, competitive solution configuration requirements information, and customer requirements information, including, future customer requirements. This data may be passed through the configuration generator or engine, which generates one or more proposed configurations based upon the system requirements. As an added feature, the configuration generator or engine may generate a proposed configuration based on Oracle license comparisons/analysis, bill of materials, total cost of ownership (e.g., hardware, software, support, services) comparison with the current computing environment and/or a competitive computing environment.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, compact disks, and magnetic-optical disks, read-only memories (ROMs), random access memories (RAMs), erasable programmable read-only memories (EPROMs), electronically erasable programmable read-only memory (EEPROMs), magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, an exemplary embodiment of a computing device 120 having a dynamic configuration generator for determining a configuration of a proposed computing system upon which a software application is to be deployed is shown. In some embodiments, the computing system may be comprised of a converged infrastructure for implementing virtualized information technology resources across an enterprise.

As shown in FIG. 1, the system 100 includes at least one computing device 120, a network 150, at least one server 160, and a storage device 170. System 100 also may include a computing system having a converged infrastructure 190. In general, the system 100 may include components, such as software stored on magnetic, optical, or other media and operating on one or more processors in the computing device 120. The computing device 120 may include a display manager 122, an input manager 128, applications 124 a processor 125, memory 126, a configuration generator 129, and a data store 130. The display manager 122 and input manager 128 in cooperation with the configuration generator 129 provide the dynamic configuration of a computing system information, including converged infrastructure configuration information, as will be described further in detail. In particular, the computing device 120 may have a display screen for displaying reports and for receiving input from a user of the computing device. An exemplary display of the computing device 120 may be controlled by the display manager 122 which manages how reports and various other windows associated with applications may be displayed on the screen. The input manager 128 manages information received from, and manually input by, a user through either a keyboard or a USB input (not shown). The input manager 128 also may receive current computing system information via an electronic interface, such as an application programming interface (API), an electronic file, etc. The input manager 128 communicates with the configuration generator 129, which generates one or more proposed configurations responsive to receiving software application information, current computing system information, and future computing system requirements information.

Although not shown, in various embodiments, the computing device 120 may be a notebook computer, a tablet computer, a desktop computer, a microprocessor-based or a programmable consumer electronic device, a network appliance, a mobile device, such as a mobile telephone, a smart telephone, a pager, a radio frequency (RF) device, an infrared (IR) device, a Personal Digital Assistant (PDA), a set-top box, a camera, an integrated device combining at least two of the preceding devices, and the like.

The configuration generator 129 may be coupled to the data store 130 to receive data for determining one or more proposed configurations of the computing system 190. For example, the input manager 128 may receive software application information, such as software application identification information and software application licensing information (i.e. software licensing rules, methodology, and metrics). The input manager 128 may transfer the software application information to the configuration generator 129 for processing. The configuration generator 129 may also receive current computing system requirements information and future computing system requirements information. The computing system requirements information may include current computing system identification information and current computing system technical specification information identifying, for example, a number of processor cores currently required for deploying the software application. The future computing system requirements information may include future computing system growth information and future computing system target utilization information. The growth rate for the system resources may include a rate of growth for compute, memory, network and storage resources. The future computing system target utilization information may include information identifying a maximum extent to which a computing system may be utilized (high-water mark) in deploying the associated software application. Future computing requirements information also may include information identifying application availability requirements and application and/or system software requirements, and information specifying whether the proposed computing system should be a virtualized environment.

In some embodiments, the configuration generator 129 may dynamically generate one or more proposed configurations based upon the received information to provide an optimized computing system, wherein, the total cost of ownership is reduced. In particular, responsive to receiving the software application information, the current computing system requirements information and the future computing system requirements information, the configuration generator 129 may generate one or more proposed computing system configurations or configuration information. The proposed computing system configuration information may include information identifying a proposed configuration for one or more proposed computing system, where each of the proposed configurations satisfies the proposed computing resources requirements identified in the current computing system requirements information, and each of the proposed configurations satisfying the future computing system requirements identified in the future computing system requirements information.

Computing device 120 having a local data store 130 may be coupled by a network 150 to the server 160 having its own configuration generator module 165. The server 160 may couple to the storage device 170 for reference to previously stored software application information 175 and system environment data 177. Applications 124 may be comprised of operating systems, database applications, e-mail applications, and virtual machines, productivity applications, browser applications, and the like. In some embodiments, the configuration generator 129 may serve as a device that communicates with the display manager 122 to perform the method of dynamic generation of one or more proposed configurations for a computer system described more in detail below. In other embodiments, the configuration generator module 165 located on server 160 may communicate with computing device 120 and generate or provide one or more proposed configurations for a computing system, serving as the sole agent that performs the method of dynamic configuration generation based upon software application information described herein. The device 120, server 160, and the storage device 170 may reside on the same LAN, or on different LANs that may be coupled together through the Internet, but separated by firewalls, routers, and/or other network devices. In one embodiment, one or more devices 100 may couple to server 160 through communication network 150. In another embodiment, one or more computing devices 120, server 160, and the storage device 170 may reside on different networks. As shown, in some embodiments, the server 160 may reside in a cloud network.

The server 160 may comprise a processor (not shown), memory (not shown), and configuration generator module 165. In some embodiments, the system 100 may comprise processing software instructions and/or hardware logic required for dynamic configuration generation of computing systems having a converged infrastructure according to the embodiments described herein. The server 160 may provide remote cloud storage capabilities for all security-related data associated with files, website links, uniform resource locators (URLs), and the like, through the storage device 170 coupled by network 150. Further, these may couple to one or more tape-out devices (not shown) or any other secondary datastore. As such, a database may be stored within a local data store, remote disks, secondary data storage devices, or tape-outs devices (not shown). The local data store may represent a single or multiple data structures (databases, repositories, files, etc.) residing on one or more mass storage devices, such as magnetic or optical storage based disks, tapes or hard drives. Further, the server 160 may communicate with the remote storage devices over a public or private network. Although not shown, in various embodiments, the server 160 may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, central computing server, cloud deployment, an integrated device combining at least two of the preceding devices, and the like.

In operation, one embodiment of a method for dynamically generating one or more proposed configurations for a computing system based upon software application information and system environment data may include sensing user submission of data relating to the computer system. For example, the input manager 128 may detect when the user enters software application information in a user interface associated with the dynamic configuration generator or requests the same from data store 130. For example, the configuration generator 129 may receive the software application information, which is information including software application identification information and software application licensing information. The configuration generator 129 may also receive current computing system requirements information and future computing system requirements information. The future computing system requirements information may include future computing system growth information and future computing system target utilization information. In particular, the configuration generator 129 may extract a system description from the current computing system requirements information and request specification and metrics data based upon the system description from a service provider. The configuration generator 129 may also detect the number of servers, the number sockets, number of cores per socket, a processor speed, types of processors, and memory, network, storage and virtualization performance and metrics.

In response to the receipt of the software application information, the current computing system information and the future computing system requirements information, the configuration generator 129 may dynamically generate one or more proposed configurations based upon the received information to provide an optimized converged infrastructure, wherein the total cost of ownership is reduced. In particular, responsive to receiving the software application information, the proposed computing system information and the future computing system requirements information, the configuration generator 129 may generate one or more proposed computing system configurations or configuration information. The proposed computing system configuration information may include information identifying a proposed configuration for one or more proposed computing system, where each of the proposed configurations satisfies the proposed computing resources requirements identified in the proposed computing resources requirements information, and each of the proposed configurations satisfies the future computing system requirements identified in the future computing system requirements information. For example, the configuration generator 129 may detect the number of processing cores, or memory, network or storage resources, required for the current system environment. Next the configuration generator 129 may identify the software application of the current system environment and detect the maximum number of servers associated with the corresponding software license of the software application. Further, the configuration generator 129 may select the most cost effective configuration, consisting of adding and/or removing software application options, specific servers, processors, network resources, storage resources, memory resources, converged infrastructure resources, virtualized resources, as well as a number of processing cores based upon the maximum number of servers and a server performance requirement to form a computing system configuration.

In some embodiments, the system for dynamically generating configurations of the computing system may further include retrieving costs analysis data for a converged infrastructure configuration. In response to the receipt of the cost analysis data, the configuration generator 129 may generate a total cost of ownership for the converged infrastructure configuration. Further, the configuration generator 129 in cooperation with the display manager 122 may provide a report of, or otherwise output information about, the costs analysis data and the total cost of ownership for the particular computing system either on the display or in a file. In some embodiments, the configuration generator 129 may generate a Year-over-Year (YoY) growth rate prior to generating one or more proposed computing system configurations based upon the growth rate. Similarly, the configuration generator 129 may detect the number of storage units required for the current system environment and determine the number of storage units for one or more proposed computing system configurations based upon the YoY growth rate. Further, the configuration generator 129 may detect the number of processing cores associated with a particular configuration and detect an excess core count with the intent of determining the fewest required processing cores while evaluating core count efficiency or lowest excess cores. Based upon the excess core count, the configuration generator 129 may determine a core cost saving between the cost of the number of cores for a proposed configuration and the cost of a number of cores associated with the current system environment.

By way of a non-limiting example, in some embodiments, the configuration generator 129 may receive current computing system requirements information including system specifications, peak utilization data, virtualization information, software information, and performance data. For example, the current computing system specification may require Exadata X4-2 Half Rack database servers, available from Oracle Corporation of Redwood Shores, Calif., each with four (4) database servers each containing two (2) Xeon processor ES-2697 v2, 2.7 GHz, and 128 GB, available from Intel Corporation of Sunnyvale, Calif., having 96 total processing cores and 512 GB of total RAM. Further, the system specification may include the requirement of seven (7) Exadata storage cells, also available from Oracle Corporation, with 336 TB total raw storage capacity. The peak utilization may be 70% for CPU and 80% for memory. Other data that may be provided regarding peak utilization may include total peak physical input/output operations per second, total peak bandwidth, and total use storage capacity.

Another current environment input may include virtualization information. For example, the system may require "bare metal" deployment or a virtualized one.

The software application information may include information about the name of software, the software license model/metric, software unit costs, and the number of software licenses, the software version, and the computing environment. For example, the software application information may comprise information identifying forty-eight (48) Oracle Enterprise Edition (EE) database licenses, version11gR2, and a real application cluster (RAC) environment. The performance data of current environment inputs may include information about performance rate for the server and the storage components. For example, the SPECint rate base2006 value of the server component may be 940.

In some exemplary embodiments, the configuration generator 129 may receive future environment assumptions, including information about growth rate, utilization rate, system requirements, virtualization, and architectural information. For example the growth rate may include a design for three years with an annual growth rate of 25% for the CPU, 25% for the memory, and 0% for storage. The utilization rate may include a target peak of 75% for the CPU and 80% for memory. The virtualization information may require physical-to-physical deployment. The architectural information may require that the system be configured for work load without high availability and that the Oracle database version12c be included.

In other exemplary embodiments, the configuration generator may receive information about a competitive computing environment, such as system specification, software application information and performance associated with a competitive computing environment. For example, a competitive computing environment may have system an Exadata X6-2 Half Rack server, available from Oracle Corporation, with Xeon processor ES-2699 v4, 2.3 GHz, available from Intel Corporation, and 256 GB or RAM, where the total number of processing cores is 176 and the total RAM is 1024 GB. Further, the competitive computing system information may include specify seven (7) Exadata storage cells, which is available from Oracle Corporation, with 627 TB total Exadata raw storage capacity. The software application information for the competitive computing environment may identify 88 required Oracle database licenses, and Specint rate base2006 value for each database server is 1700.

In some exemplary embodiments, in response to receiving the computing system information described above, the configuration generator 129 may generate configuration information for a computing system upon which the software application will be deployed. For example, given the information described above, the generated configuration information may specify a Vblock® System 540, available from VCE Company, LLC of Richardson, Tex. The Vblock System 540 may include eight (8) compute servers, each having two (2) Xeon E5-2667v3 processors, available from Intel Corporation, each of which operates at 3.2 GHz, and has eight (8) cores, for a total of 128 Cores. Each server also may have 128 GB of RAM for a total of 1024 GB of RAM. Such a configuration would require a total of sixty-four (64) Oracle database licenses. The configuration also has a Specint rate base2006 value of 814.

In some exemplary embodiments, the configuration generator 129 may generate information, such as a report, comparing the various generated configurations. For example, the generated configuration that specifies a particular Vblock® Systems configuration may require 11% fewer cores than a current computing environment and 27% fewer cores than the configuration specifying the Oracle Exadata X6-2 storage server. Further, the configuration specifying the Vblock® System would require sixteen (16) fewer Oracle database licenses than the configuration for the competitive computing environment. Moreover, the configuration generator 129 also may generate information, such as a report, indicating that the Vblock® configuration delivers 1.3 times more compute power than the current computing environment and 1.32 times more compute power than the competitive computing environment specifying the Oracle Exadata X6-2 server.

In some exemplary embodiments, the configuration generator 129 may generate information about the total cost of ownership (TCO) of various proposed configurations over a predefined period of time (i.e. three years). For example, the TCO information may include information about total hardware net cost, the total Oracle database software net cost, the total Oracle Exadata software net cost, the total hypervisor software net cost, the total services net cost, the total Oracle software support costs, the total hardware support costs, and the total hypervisor support costs. The total Oracle license and support costs along with non-Oracle costs may be compared with the costs of the competitive computing environment. In particular, the configuration generator 129 may generate information comparing the cost of the proposed configuration specifying the Vblock® System to the cost of the current computing environment as well as the cost of the competitive computing environment specifying the Oracle Exadata X6-2 server. The configuration generator also may generate information, such as a report, analyzing cash flow over a predetermined period of time (e.g. five years) for each of the proposed configurations.

In some exemplary embodiments, the virtualized resources of computing system 190 may be implemented on a converged infrastructure, a hyper converged infrastructure or a software container infrastructure. As shown in FIG. 1, one or more proposed configurations may be provided to computing system 190 within a converged infrastructure environment, implemented across an enterprise's virtualized resources, in accordance with some example embodiments. The converged infrastructure 190 may include a plurality of components, such as servers, data storage devices, network equipment, and associated software. In some example embodiments, the converged infrastructure is implemented by one or more Vblock® Systems.

By way of non-limiting example, in some embodiments, the converged infrastructure 190 for which a configuration may be determined may be a hyper-converged infrastructure. A hyper-converged infrastructure is characterized by a software-centric architecture that tightly integrates servers, data storage devices, network equipment, and associated software and virtualization resources, in a commodity hardware box supported by a single vendor. Hyper-convergence is related to the concept of converged infrastructure, which is an infrastructure approach where a single vendor provides a pre-configured bundle of hardware and software in a single chassis with the goal of minimizing compatibility issues and simplifying management. If required, however, the hardware components of a converged infrastructure can be separated and used independently. The hardware components in a hyper-converged infrastructure, however, are so integrated that they typically cannot be separated. In some example embodiments the hyper-converged infrastructure is implemented by a VxRack™ System, available from the VCE Company, LLC of Richardson, Tex.

The converged infrastructure 190 of some embodiments may include one or more compute layer 195 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure and 90 may further include one or more storage layer 196 components, such as one or more storage arrays and/or other mass storage devices that may be implemented on a converged infrastructure. In some embodiments, the converged infrastructure and 90 may additionally include one or more network layer 197 components, such as one or more switches and/or other network layer components that may be implemented on a converged infrastructure. For example, the network layer 197 may include components that provide switching and routing between the compute layer 195 and storage layer 196 within the converged infrastructure 190. The network layer 197 may additionally or alternatively include components that provide switching and routing between the converged infrastructure 190 and a network so as to support network communication between a component(s) of the converged infrastructure 190 and a computing platform(s) independent of the converged infrastructure 190. The components of the compute layer 195, storage layer 196, and network layer 197 may collectively provide a physical infrastructure of the converged infrastructure 190.

The converged infrastructure 190 may additionally include a virtualization layer 192, which may include one or more virtualization components configured to support one or more virtualized computing environments. The components of the virtualization layer 192 may include components embodied in software, hardware, firmware, and/or some combination thereof. For example, the virtualization layer 192 may include a hypervisor and/or other virtualization components that may be configured to create and run virtual machines and/or to otherwise virtually simulate a computing environment. In some example embodiments, the virtualization layer 192 may include and/or may be communicatively coupled with one or more management components configured to support management of the converged infrastructure 190. For example, in some embodiments, the virtualization layer 192 may include a management infrastructure, which may provide management resources for managing the converged infrastructure 190. In some such embodiments, the management infrastructure may be a separate system from the converged infrastructure, but may be connected to the converged infrastructure to allow management of the entire converged infrastructure 190. In some example embodiments, the virtualization layer 192 may utilize physical hardware resources of the compute layer 195, storage layer 196, and/or network layer 197 to support operation of one or more components of the virtualization layer 192. Additionally or alternatively, in some example embodiments, the virtualization layer 192 may include dedicated physical resources (e.g., physical hardware components) that may provide computing, storage, and/or network communication resources to one or more components of the virtualization layer 192.

It will be appreciated that the compute layer 195, storage layer 196, network layer 197, and virtualization layer 192 as illustrated in FIG. 1 and described above are provided by way of example, and not by way of limitation. In this regard, in some embodiments, aspects of the compute layer 195, storage layer 196, network layer 197, and virtualization layer 192 as described above may not be mandatory and thus some may be omitted in certain embodiments. Additionally, the converged infrastructure 190 of some embodiments may include further or different layers and/or components beyond those illustrated in and described with respect to FIG. 1.

Physical components of the converged infrastructure 190 may be communicatively coupled with each other to support operation of the converged infrastructure 190 via direct connection and/or network communication. For example, as discussed above, in some example embodiments, the network layer 197 may provide switching and routing between physical components of the converged infrastructure.

In some embodiments at least a portion of the components of the converged infrastructure 190 may be assigned addresses, such as Internet Protocol (IP) addresses and/or other network layer addresses, via which the components may be accessed by another component internal to the converged infrastructure 190 and/or via a computing device external to the converged infrastructure 190. For example, in some example embodiments, the converged infrastructure 190 and/or one or more network addressable components thereof may be accessed by an external computing device over a network to which the converged infrastructure 190 of some embodiments may be connected.

It is appreciated that the components of exemplary operating environment 100 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the computing architecture using any arrangement components necessary to perform the dynamic security data content viewing and other security-related features (and functionality); and can be implemented in one or more separate or shared modules in various combinations and permutations.

Figure 2:
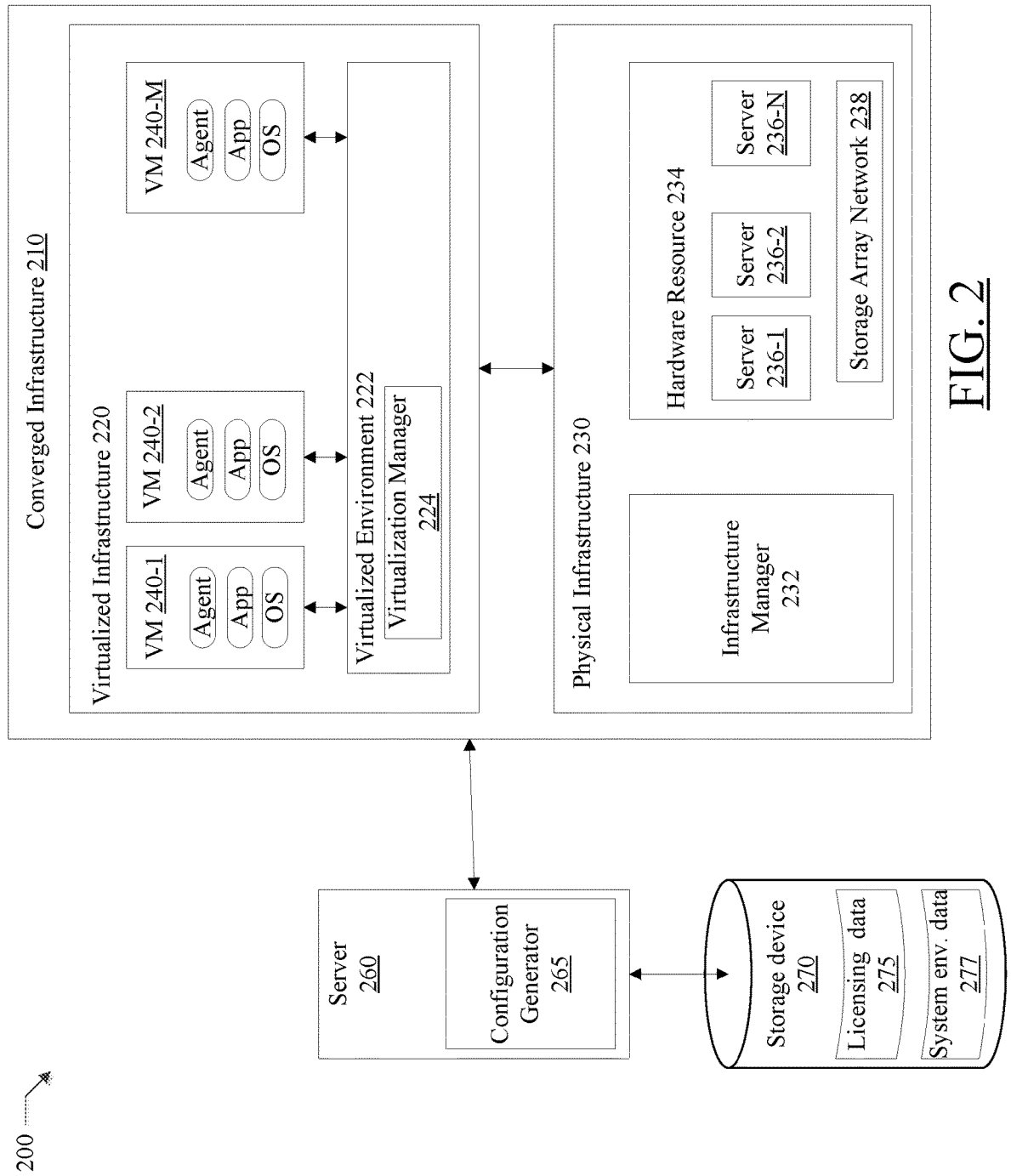
FIG. 2 is a diagram of a machine-level virtualization environment, the resources of which may be configured across the enterprise of FIG. 1, in accordance with some embodiments.

FIG. 2 is a diagram of a machine-level virtualization environment 200, in which a configuration generation system that may be deployed, in accordance with some example embodiments. It will be appreciated that the components and associated architecture illustrated in and described with respect to FIG. 2 are provided by way of example, and not by way of limitation. In this regard, components illustrated in FIG. 2 and described further below may not be mandatory and thus some may be omitted in certain embodiments. Additionally, some embodiments may include further or different components, beyond those illustrated in and described with respect to FIG. 2. Further, it will be appreciated that converged infrastructures within the scope of the disclosure may implement architectures other than that illustrated in and described with respect to FIG. 2.

The machine-level virtualization environment 200 may include a physical infrastructure 230 configured to support a virtualized infrastructure 220. In some example embodiments, the physical infrastructure 230 may include hardware resources 234, such as servers 236-1 to 236-N (sometimes referred to as "hosts") and one or more storage array networks (SAN), such as SAN 238, which may be communicatively connected by a network (not shown). The physical infrastructure 230, including hardware resources 234 may, for example, provide an embodiment of the compute layer 195, storage layer 196, and network layer 197. For example, the servers 236 may comprise an implementation of the compute layer 195, and the SAN 238 may comprise an implementation of the storage layer 196. The hardware resources 234, including, for example, the servers 236 and SAN 238 may be communicatively connected by an embodiment of the network layer 197.

In some example embodiments, the physical infrastructure 230 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 230. One such example of physical infrastructure 230 is a Vblock® system available from the VCE Company, LLC.

The physical infrastructure 230 may further include an infrastructure manager 232 configured to manage the configuration, provisioning, and policy compliance of the physical infrastructure 230. Infrastructure manager 232 may be configured to provide an interface by which provisioning of hardware resources 234 (e.g., computing, networking, storage) may be managed with policy-based automation. According to some embodiments, the infrastructure manager 232 may be included in every physical infrastructure 230 to manage the configuration, provisioning, and compliance of computing-block based infrastructure. As described in further detail below, the virtualized infrastructure 220 (or component thereof) of some example embodiments may be configured to connect to and communicate with the infrastructure manager 232 to manage and/or configure the physical infrastructure 230 to support operation of components of the virtualized infrastructure 220. One example of an infrastructure manager 232 includes EMC Ionix Unified Infrastructure Manager (UIM) available from EMC Corporation. In some embodiments, the infrastructure manager 232 may further be configured to provide network manager functionality such that the infrastructure manager 232 may be configured to configure network devices (e.g., switches, routers) and manage addressing, subnets, virtual local area networks (VLANs), and/or other network configurations that may be implemented on the converged infrastructure 210. One example of a network manager that may be included on the infrastructure manager 232 of such embodiments is a Cisco Switch, such as may be accessible via a Cisco IOS® command line interface (CLI), available from Cisco System, Inc.

The virtualized infrastructure 220 may include a virtualization environment 222 comprising one or more virtual machines (VM) 240, such as VM 240-1 to VM 240-M. Each virtual machine 240 can have an operating system (OS), one or more applications (APP) and an agent (AGENT). In some embodiments, one or more of the virtual machines 240 may be configured to connect to one or more users by a communications network, such as the Internet. The virtualized infrastructure 220 may, for example, comprise an embodiment of at least a portion of the virtualization layer 222.

The virtualization environment 222 may accordingly be configured to simulate (e.g., to virtualize) conventional components of a computing device, such as a processor, system memory, a hard disk drive, and/or the like for executing the VMs 240. For example, each VM 240 may include a virtual processor and a virtual system memory configured to execute an application. Thus, for example, the converged infrastructure 210 of some example embodiments may be configured to perform physical-to-virtual conversion of hardware resources 234 and/or other physical computing of the physical infrastructure 230 to support or host virtual machines 240 in the virtualized infrastructure 220. In this regard, components of the physical infrastructure 230 may include physical components, such as physical servers and/or other computing devices, memories, buses, networks, and/or other physical components, which may collectively support the virtualized infrastructure 220 and VMs 240.

A virtualization manager 224 of the virtualization environment 222 may be configured to establish and oversee the VMs 240. The virtualization manager 224 may be configured to dynamically allocate resources among the virtual machines 240. For example, in some embodiments, the virtualization manger 224 may be configured to communicate with the infrastructure manager 232 to manage and/or configure the physical infrastructure 230 to support operation of the virtual machines 240. The virtualization manager 224 of some example embodiments may be implemented with the VMware® vCenter® virtualized management platform available from VMware, Inc., of Palo Alto, Calif.

In some example embodiments, virtualization environment 222 may be implemented by running VMware vSphere® and/or VMware ESX®-based hypervisor technologies, available from VMware, Inc., on servers 236. However, it will be appreciated that any virtualization/hypervisor/container technology may be used in addition to or in lieu of VMware hypervisor technologies in accordance with various example embodiments.

FIG. 2 also shows a configuration generation system 260, for dynamic configuration of a computing device based upon software application specifications and metrics, wherein the computing system includes virtualized information technology resources across an enterprise. In particular, the configuration generator 265 may be configured to dynamically generate and store one or more proposed configurations based upon the received software application information current computing system information and future computing system requirements information to provide an optimized converged infrastructure wherein the total cost of ownership is reduced. Configuration generator 265 may provide one or more configurations, which configure an enterprise's virtual resources in a machine-level virtualization environment 220, in accordance with some example embodiments. A sample embodiment of the dynamic configuration generation system is illustrated in more detail in FIG. 1 and is discussed in more detail in the discussion of FIG. 1 above.

As may be appreciated, rather than deploying a software application, for which resources need to be identified for deployment, in the machine-level virtualization environment 200 shown in FIG. 2, the software application may be deployed in an operating system-level virtualization environment, which is also known as a software container virtualized infrastructure. As also may be appreciated, operating system-level virtualization is a technique where the kernel of an operating system allows for multiple isolated user-space instances. These instances run on top of an existing host operating system and provide a set of libraries that applications interact with, giving them the appearance that they are running on a machine dedicated to their use. These instances are sometimes referred to as software containers and, thus, such an operating system-level virtualization environment may also be referred to as a software container virtualized infrastructure.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations.

Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 3:
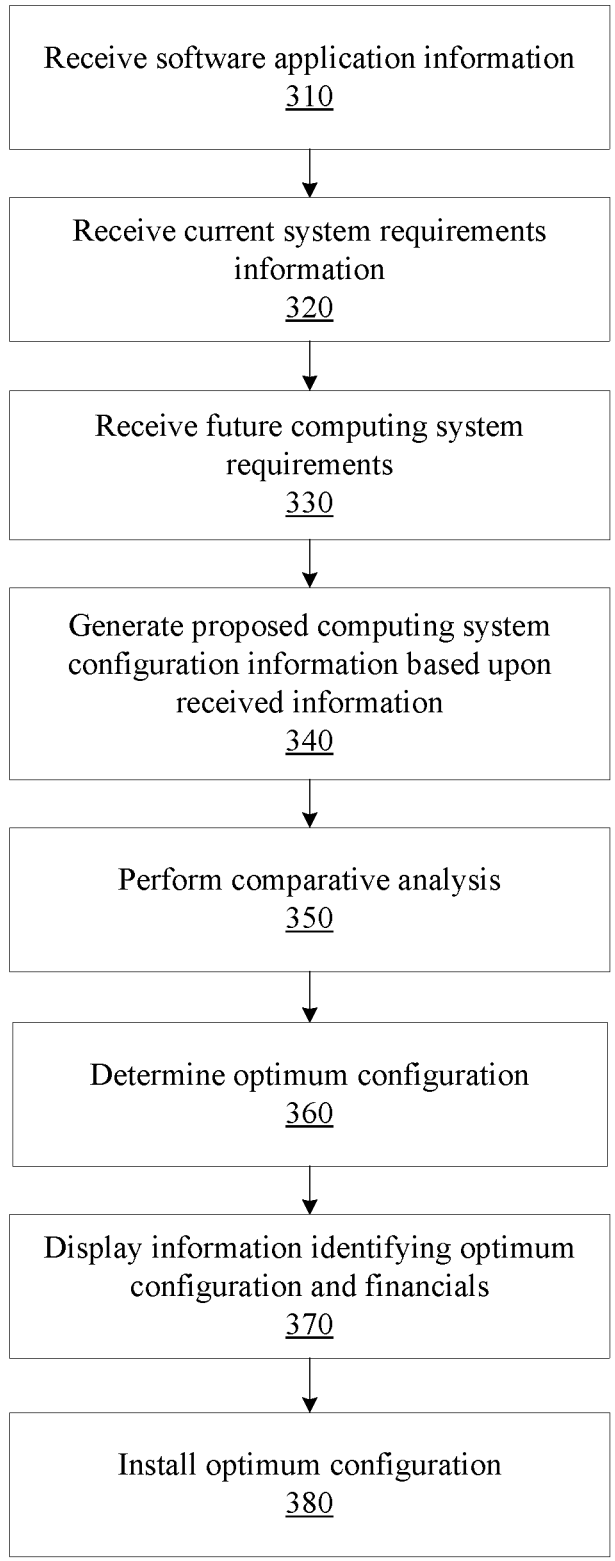
FIG. 3 is a flow diagram of a method for configuring a converged infrastructure based upon software specification and licensing metrics in accordance with some embodiments.

FIG. 3 is an exemplary flow diagram of a method 300 for generating configuration information for a computing system upon which a software application may be deployed. The configuration information may be generated from software specification and licensing information, in accordance with some embodiments. In an operation 310, the method 300 may include receiving software application information, which is information including software application identification information and software application licensing information. The software application information may include software application identification information, comprising information identifying a software application to be deployed, and software application licensing information, which may comprise information identifying costs for licensing the identified software application. Processing may continue with operation 320.

In operation 320, method 300 may further include receiving current computing system information, including environment specifications and metrics. For example, the method 300 may receive current computing resources requirements information. Further, the current computing system requirements information may include information identifying a current configuration for the computing system upon which the software application is currently deployed. Processing may continue with operation 330.

In operation 330, method 300 may also receive future computing system requirements information, wherein the future computing system requirements information includes future computing system growth information and future computing system target utilization information. Processing may continue with operation 340.

In operation 340, responsive to receiving the software application information, the current computing system requirements information and the future computing system requirements information, method 300 may generate one or more proposed configurations based upon the received information to provide an optimized computing system configuration. Each of proposed configurations satisfies the current computing system requirements and the future computing system requirements. In some exemplary embodiments, the proposed configuration may be a converged infrastructure. Processing may continue with operation 350.

In operation 350, method 300 may perform a comparative analysis between the one or more proposed configurations. Processing may continue with operation 360.

In operation 360, method 300 may determine an optimum configuration. The optimum configuration may be a configuration that minimizes the total cost of ownership relative to other proposed configurations. The optimum configuration also may be determined based on some other parameter, such as a customer—specified parameter regarding computing system performance, datacenter/operational impact, system footprint, etc. Processing may continue with operation 370.

In operation 370, method 300 may generate information, such as reports, comprising a comparative analysis and optimum configuration and display the generated information. Processing may continue with operation 380.

In operation 380, method 300 may cause a computing system to be configured in accordance with one of the generated configurations, such as the optimum configuration.

Figure 4:
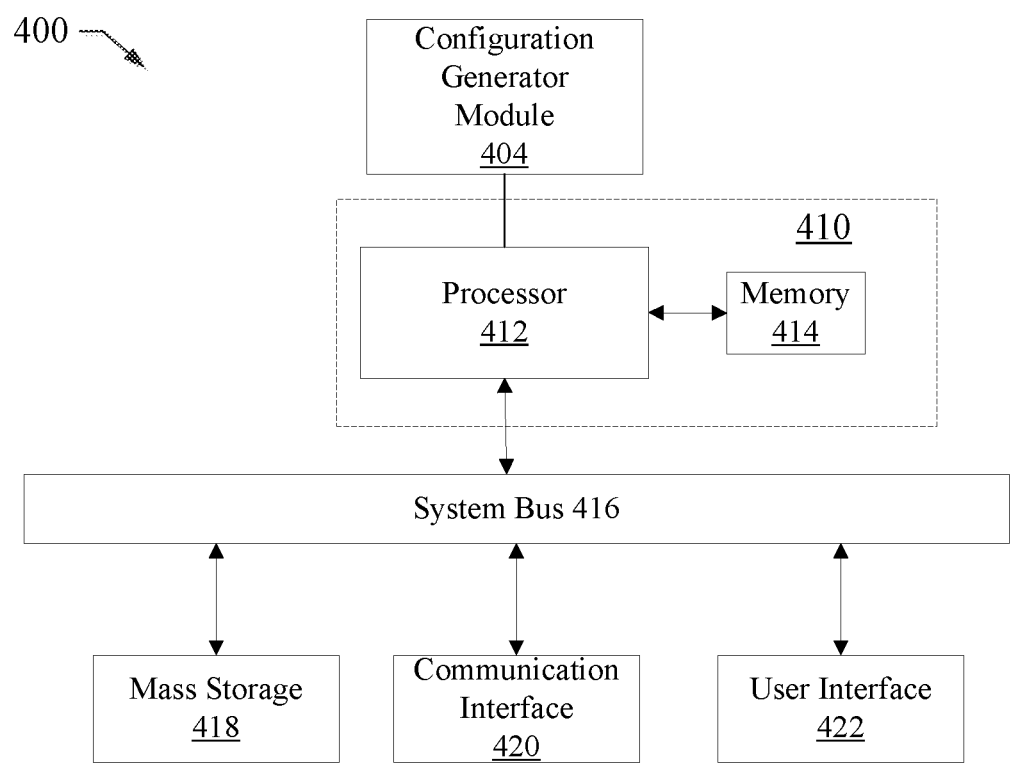
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for performing the configuration generation in accordance with some embodiments. FIG. 4 is a diagram of an example computing system 400 that may be used to implement some example embodiments of a resource allocation system. The computing system 400 may be implemented on any computing device or plurality of computing devices that may be configured to implement one or more example embodiments. By way of non-limiting example, in some embodiments, the computing system 400 may be implemented on a user terminal and/or a computing platform(s) of a converged infrastructure.

The computing system may include a plurality of elements, such as processing circuitry 410, mass storage 418, communication interface 420, and user interface 422, which may be interfaced via a system bus 416. It will be appreciated that the components, devices or elements illustrated in and described with respect to FIG. 4 below may not be mandatory and thus some may be omitted in certain embodiments. Additionally, the computing system 400 of some embodiments may include further or different components, devices or elements beyond those illustrated in and described with respect to FIG. 4.

Further, while FIG. 4 illustrates an architecture including elements interfaced via the system bus 416, it will be appreciated that in some example embodiments, elements of the computing system 400 may be implemented in a distributed computing environment in which elements may be distributed across a plurality of computing devices, which may be in communication with each other, such as via a network, to provide functionality of the computing system 400. As such, in some example embodiments, elements of the computing system 400 may be communicatively coupled via a network in addition to or in lieu of the system bus 416.

The computing system 400 of some example embodiments may implement an operating system(s), such as MICROSOFT WINDOWS™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated; however, that in some embodiments, one or more aspects of the computing system 400 may be implemented on and/or integrated with a virtualized computing system, such as may be provided by a converged infrastructure.

In some example embodiments, the computing system 400 may include processing circuitry 410 that is configurable to perform actions in accordance with one or more example embodiments disclosed herein. In this regard, the processing circuitry 410 may be configured to perform and/or control performance of one or more functionalities for determining a configuration of a converged infrastructure, such as converged infrastructure, in accordance with various example embodiments. Thus, the processing circuitry 410 may be configured to perform data processing, application execution and/or other processing and management services according to one or more example embodiments.

In some example embodiments, the processing circuitry 410 may include a processor 412 and, in some embodiments, such as that illustrated in FIG. 4, may further include memory 414. The processing circuitry 410 may be in communication with (e.g., via system bus 416) and/or otherwise control mass storage 418, communication interface 420, and/or user interface 422.

The processor 412 may be embodied in a variety of forms. For example, the processor 412 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 412 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 400 is embodied as a plurality of computing devices, a plurality of processors, which may collectively form the processor 412, may be distributed across a plurality of computing devices that may be in operative communication with each other directly and/or via a network. In some example embodiments, the processor 412 may be configured to execute instructions that may be stored in a memory, such as the memory 414 and/or the mass storage 418 and/or that may be otherwise accessible to the processor 412. As such, whether configured by hardware or by a combination of hardware and software, the processor 412 may be capable of performing operations according to various embodiments while configured accordingly.

In embodiments including the memory 414, the memory 414 may include read only memory (ROM), random access memory (RAM), and/or the like. The mass storage 418 may include one or more memory and/or other storage devices, which may include fixed (e.g., a fixed hard disc drive, storage array, fixed flash memory device, and/or the like) and/or removable memory devices (e.g., a removable flash memory device, an optical disc drive, and/or other removable memory device). The mass storage 418 may provide a persistent data storage device. In some example embodiments, the mass storage 418 may be configured to provide a backup storage. The mass storage 418 may include a memory device implemented locally to the computing system 400 and/or a memory device remote to the computing system 400, which may be communicatively coupled with the computing system 400, such as via a network. In some embodiments in which the computing system 400 is embodied as a plurality of computing devices, the memory 414 and/or mass storage 418 may include a plurality of memory devices, which may be distributed across a plurality of computing devices that may be in operative communication with each other directly and/or via a network to form the computing system 400.

In some embodiments, the memory 414 and/or the mass storage 418 may provide a non-transitory computer-readable storage medium that may store computer program instructions that may be executed by the processor 412. In this regard, the memory 414 and/or mass storage 418 may be configured to store information, data, applications, instructions and/or the like for enabling the computing system 400 to carry out various functions in accordance with one or more example embodiments. Applications that may be executed by the processor 412 may also be in the form of modulated electronic signals that may be accessed via a network modem or other network interface of the computing system 400.

The computing system 400 may further include a communication interface 420. The communication interface 420 may enable the computing system 400 to communicate (e.g., over a network or other communication interface) with another computing device or system, such as the converged infrastructure. In this regard, the communication interface 420 may include one or more interface mechanisms for enabling communication with other devices and/or networks. As such, the communication interface 420 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 400 may include the user interface 422. It will be appreciated, however, that in some example embodiments, one or more aspects of the user interface 422 may be omitted, and in some embodiments, the user interface 422 may be omitted entirely. The user interface 422 may be in communication with the processing circuitry 410 to receive an indication of a user input and/or to provide an audible, visual, mechanical, or other output to a user. As such, the user interface 422 may include, for example, a keyboard, a mouse, a joystick, a display, a touch screen display, a microphone, a speaker, one or more biometric input devices, and/or other input/output mechanisms.

As shown in FIG. 4, in some example embodiments, a configuration generation system 404 interfaces with computing system 400. As discussed above in connection with FIG. 4, the configuration generation system 404 may be configured to generate one or more configurations for an enterprise's virtualized resources.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, mini computers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a test framework for orchestration workflows, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a test framework for orchestration workflows is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), local area network (LAN), etc.) using any communication medium and protocols (e.g., transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VBScript, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

What is claimed is:

1. A method of at least configuring a computing system for deployment of a software application, the computing system including computing resources with at least a compute component, a memory component and a storage component, the method comprising:
   determining future requirements of the computing resources for the software application from current requirements of the computing resources for the software application, and a growth rate and a target utilization of at least one of the computing resources;
   generating proposed configurations of the computing system from the future requirements of the computing resources, the proposed configurations having respective costs of the computing system including a cost for licensing the software application, and the computing resources that satisfy the future requirements;
   configuring the computing system including the computing resources in accordance with one of the proposed configurations of the computing system; and
   deploying of the software application on the computing system after configuring the computing system.

2. The method of claim 1, wherein the cost for licensing the software application depends on the computing resources of the computing system, and configuring the computing system includes configuring the computing system in accordance with the one of the proposed configurations having a lowest of the respective costs.

3. The method of claim 2, wherein the cost for licensing the software application depends on a number of processor cores of the compute component, and configuring the computing system includes configuring the computing system in accordance with the one of the proposed configurations with a fewest number of processor cores and thereby the lowest of the respective costs.

4. The method of claim 1, wherein the computing system is a converged infrastructure computing system, and configuring the computing system includes configuring the converged infrastructure computing system.

5. The method of claim 1 further comprising storing or outputting the proposed configurations for selection.

6. An apparatus for at least configuring a computing system for deployment of a software application, the computing system including computing resources with at least a compute component, a memory component and a storage component, the apparatus comprising:
   a memory storing code; and
   a processor configured to execute the code to at least:
      determine future requirements of the computing resources for the software application from current requirements of the computing resources for the software application, and a growth rate and a target utilization of at least one of the computing resources;
      generate proposed configurations of the computing system from the future requirements of the computing resources, the proposed configurations having respective costs of the computing system including a cost for licensing the software application, and the computing resources that satisfy the future requirements;
      configure the computing system including the computing resources in accordance one of the proposed configurations of the computing system; and
      deploy the software application on the computing system after the computing system is configured.

7. The apparatus of claim 6, wherein the cost for licensing the software application depends on the computing resources of the computing system, and the processor being configured to execute the code to configure the computing system includes being configured to execute the code to configure the computing system in accordance with the one of the proposed configurations having a lowest of the respective costs.

8. The apparatus of claim 7, wherein the cost for licensing the software application depends on a number of processor cores of the compute component, and the processor being configured to execute the code configure the computing system includes being configured to execute the code to configure the computing system in accordance with the one of the proposed configurations with a fewest number of processor cores and thereby the lowest of the respective costs.

9. The apparatus of claim 6, wherein the computing system is a converged infrastructure computing system, and the processor being configured to execute the code to configure the computing system includes being configured to execute the code to configure the converged infrastructure computing system.

10. The apparatus of claim 6, wherein the processor is configured to execute the code to further store or output the proposed configurations for selection.

11. A computer-readable medium for at least configuring a computing system for deployment of a software application, the computing system including computing resources with at least a compute component, a memory component and a storage component, wherein the computer-readable medium is non-transitory and includes code executable by a processor to cause an apparatus to at least:
   determine future requirements of the computing resources for the software application from current requirements of the computing resources for the software application, and a growth rate and a target utilization of at least one of the computing resources;
   generate proposed configurations of the computing system from the future requirements of the computing resources, the proposed configurations having respective costs of the computing system including a cost for licensing the software application, and the computing resources that satisfy the future requirements;
   configure the computing system including the computing resources in accordance with one of the proposed configurations of the computing system; and
   deploy of the software application on the computing system after the computing system is configured.

12. The computer-readable medium of claim 11, wherein the cost for licensing the software application depends on the computing resources of the computing system, and apparatus being caused to execute the code to configure the computing system includes being caused to execute the code to configure the computing system in accordance with the one of the proposed configurations having a lowest of the respective costs.

13. The computer-readable medium of claim 12, wherein the cost for licensing the software application depends on a number of processor cores of the compute component, and apparatus being caused to execute the code to configure the computing system includes being caused to execute the code to configure the computing system in accordance with the one of the proposed configurations with a fewest number of processor cores and thereby the lowest of the respective costs.

14. The computer-readable medium of claim 11, wherein the computing system is a converged infrastructure computing system, and apparatus being caused to execute the code to configure the computing system includes being caused to execute the code to configure the converged infrastructure computing system.

15. The computer-readable medium of claim 11, wherein the computer-readable medium includes code executable by the processor to cause the apparatus to further store or output the proposed configurations for selection.

\* \* \* \* \*